(12) United States Patent
Woloszyn et al.

(10) Patent No.: US 11,754,134 B2
(45) Date of Patent: Sep. 12, 2023

(54) DEVICE FOR AUTOMATICALLY ADJUSTING THE CLEARANCE OF A PARKING BRAKE

(71) Applicant: BREMBO S.p.A., Curno (IT)

(72) Inventors: Tomasz Woloszyn, Curno (IT); Marco Radaelli, Curno (IT); Italo Pirovano, Curno (IT)

(73) Assignee: Brembo S.p.A., Curno (IT)

( * ) Notice: Subject to any disclaimer, the term of this patent is extended or adjusted under 35 U.S.C. 154(b) by 0 days.

(21) Appl. No.: 17/756,420

(22) PCT Filed: Nov. 25, 2020

(86) PCT No.: PCT/IB2020/061116
§ 371 (c)(1),
(2) Date: May 25, 2022

(87) PCT Pub. No.: WO2021/105891
PCT Pub. Date: Jun. 3, 2021

(65) Prior Publication Data
US 2022/0389982 A1    Dec. 8, 2022

(30) Foreign Application Priority Data

Nov. 26, 2019   (IT) .......................... 102019000022113

(51) Int. Cl.
*F16D 65/56* (2006.01)
*F16D 51/20* (2006.01)
*F16D 65/22* (2006.01)

(52) U.S. Cl.
CPC .......... *F16D 65/566* (2013.01); *F16D 51/20* (2013.01); *F16D 65/22* (2013.01)

(58) Field of Classification Search
CPC ......... F16D 65/566; F16D 65/22; F16D 51/20
See application file for complete search history.

(56) References Cited

U.S. PATENT DOCUMENTS 3,216,533 A   11/1965   Hagerty et al.
3,893,548 A    7/1975   Bolenbaugh
(Continued)

FOREIGN PATENT DOCUMENTS

EP    1558855 A1    8/2005
EP    2256362 A1   12/2010
WO  2018116095 A1   6/2018

OTHER PUBLICATIONS

European Patent Office, International Search Report, issued in PCT/IB2020/061116, dated Apr. 7, 2021, Rijswijk, NL.

*Primary Examiner* — Vishal R Sahni
(74) *Attorney, Agent, or Firm* — Marshall & Melhorn, LLC

(57) ABSTRACT

A device for adjusting clearance of a drum brake has an extendable strut assembly having a toothed ring and arranged between first and second shoes cooperating with a braking surface of a drum and moved by an actuating device from a resting position, in which they are distanced from the braking surface, to a braking position, in which they abut against the braking surface. The device has a first lever assembly, a second lever assembly having a coupling portion, and a connecting member having a connecting seat. The coupling portion is coupled to the connecting seat with a predetermined functional clearance. When the first and second shoes move from the resting position, the coupling portion slides in the connecting seat with an idle stroke equal to the predetermined functional clearance without transmitting motion to the connecting member and the first lever assembly. The second lever assembly transmits motion to the connecting member after the coupling portion has covered the idle stroke.

10 Claims, 12 Drawing Sheets

(56) References Cited

U.S. PATENT DOCUMENTS

| | | | |
|---|---|---|---|
| 3,958,674 A | 5/1976 | Borkowski | |
| 6,328,141 B1 | 12/2001 | Asai et al. | |
| 2003/0168297 A1* | 9/2003 | Ikeda | F16D 65/563 188/328 |
| 2003/0226729 A1* | 12/2003 | Ohnishi | F16D 65/566 188/314 |
| 2006/0144658 A1* | 7/2006 | Tessitore | F16D 51/22 188/325 |
| 2006/0219493 A1* | 10/2006 | Taniguchi | F16D 65/563 188/71.7 |
| 2011/0259678 A1* | 10/2011 | Fujiyama | F16D 51/20 188/79.51 |
| 2019/0316643 A1* | 10/2019 | Woloszyn | F16D 65/565 |
| 2022/0065317 A1* | 3/2022 | Wittlinger | F16D 65/60 |
| 2022/0389982 A1* | 12/2022 | Woloszyn | F16D 65/561 |

\* cited by examiner

DEVICE FOR AUTOMATICALLY ADJUSTING THE CLEARANCE OF A PARKING BRAKE

CROSS-REFERENCE TO RELATED APPLICATIONS

This application is a National Phase Application of PCT International Application No. PCT/IB2020/061116, having an International Filing Date of Nov. 25, 2020 which claims priority to Italian Application No. 102019000022113 filed Nov. 26, 2019, each of which is hereby incorporated by reference in its entirety.

FIELD OF THE INVENTION

The present invention relates to a device for automatically adjusting the wear clearance of a parking brake.

In particular, the present invention is applied to the field of parking drum brakes, preferably of drum brakes associated with a disc brake, in other words of the "Drum In Hat" (D.I.H.) type.

BACKGROUND ART

It is known that a parking drum brake comprises a drum, a first and a second shoe, a brake actuator configured to force the shoes from a resting position into pressing contact with a braking surface inside the drum.

In particular, the shoes in the resting position are spaced from the braking surface by a minimum functional operating clearance so that there is no interference between shoes and drum in the absence of a braking action.

Due to the wear of the friction material connected to the shoes, the clearance between shoes and drum when the shoes are at rest increases and therefore the stroke of the braking actuator required to force the shoes against the drum increases. Such an increase in the actuator stroke affects the performance, safety, and dimensioning of the brake system.

To keep the actuator stroke substantially constant, some drum parking brakes, in particular of the D.I.H. type, are provided with a device for adjusting the clearance between shoes and cylindrical surface inside the drum.

Usually, the known type of clearance adjustment devices comprise an adjustable strut housed in special seats on the shoes and held in place by a retaining spring connected to the shoes. Such an extensible strut comprises a nut screw mechanism with a rotatable toothed wheel configured to extend the strut and thus adjust the distance between the two shoes in the presence of wear.

The strut extension adjustment in some adjustment devices is of the manual type and requires the intervention of an operator, while in other adjustment devices it is of the automatic type and in particular the clearance is adjusted by mechanical elements during the use of the braking system.

In particular, clearance adjustment devices configured to extend the adjustable strut in the presence of a braking action below a certain predefined threshold to recover the wear clearance and not extend the strut beyond the recovery of the wear clearance are known.

For example, documents U.S. Pat. Nos. 3,216,533, 3,893, 548, and 3,958,674 show a wear adjuster of the automatic type which comprises an actuating lever of a toothed wheel associated with an adjustable strut and a force transmission element to the actuating lever connected to the lever and at least one shoe. The actuating lever is hinged in a rotatable manner to a shoe and comprises a lever foot configured to interact with the toothed wheel at a clockwise rotation of the actuating lever. The force transmission element comprises at least one tensioned cable guided by at least one guide element integral with a shoe and constrained to a fixed plate of the drum brake. The actuating lever is held in a resting position biased by a torsional return spring which acts counterclockwise on the lever. In addition, the torsional spring keeps the cable in a predefined resting tension state and the lever foot at a predefined distance from one of the teeth of the toothed wheel. When the brake actuator is activated by moving the two shoes away from each other, the tension applied to the cable increases putting the actuation lever into rotation against the force of the torsional return spring and the lever foot comes into contact with one of the teeth of the toothed wheel whenever the shoes have approached to the drum by the minimum operating distance. In the presence of wear, the shoes are brought even closer to the drum by virtue of the activation of the strut by the actuating lever and once they come into contact with the braking surface of the drum the cable tension is no longer sufficient to impart a force capable of actuating the toothed wheel.

However, in the solutions described in these documents, the force transmission element, in addition to the cable, comprises a preloaded spring at a predefined preload value greater than the resistance of the lever return torsional spring so that when braking forces so great that the strut can no longer be adjusted, the preloaded spring deforms elastically and possible damage to the wear adjuster is minimized.

In the described cases known from prior art, the functional clearance, in other words the distance between lever foot and tooth of the toothed wheel which is recovered before the shoes come into pressing contact with the braking surface of the drum, is designed as a function of the length of the cable, the lever positioning tolerances, the cable coupling position tolerances to the lever, the tolerances of the connection points of the preloaded spring with respect to the cable, the number of teeth and the outer diameter of the ring.

The control of the functional clearance size is of paramount importance in a braking system because the production of functional clearance out of design tolerances implies a high risk of malfunction of the braking system itself, endangering the safety of the vehicle user and any passengers.

However, in the systems of known type mentioned above, controlling dimensional tolerances on the functional clearance is very expensive due to the high number of components and connections that must entrusted.

Furthermore, with the increase of the number of mechanical components on which the functional clearance dimensioning depends, the risk of assembly errors or of making elements out of the tolerance limits set in design increases and so does the risk of dimensioning the functional clearance to be restored at end of each braking operation out of tolerance limits.

Therefore, the need is strongly felt to have a high control of the functional clearance tolerance in terms of accuracy and repeatability, at low cost.

A further strongly felt need is to reduce the probability of errors in the step of assembly which could affect the correct operation of the braking system under high stress conditions.

In particular, in the high-end brake production sector in which it is essential to guarantee high performance which does not vary over time, the need is felt to have functional gaps which are as close as possible to those determined in detail at the lowest possible cost.

No less felt is the need for solutions capable of reducing the possibility of locking events and the development of residual torque in a Drum In Hat brake.

It is the need also felt to provide an automatic wear clearance recovery device which is easy to make, reproduce and easily adaptable and installable in the Drum In Hat brakes already on the market.

Furthermore, the need is felt to provide an automatic wear clearance recovery device for a drum brake which has a small number of components.

Solution

It is an object of the present invention to overcome the drawbacks of the prior art and to provide a solution to the need of providing an automatic clearance adjustment device of a drum brake as defined in the appended claims.

By virtue of an automatic clearance adjustment device of a drum brake, a drum brake and a method for adjusting clearance between shoes of a drum brake as described and claimed herein, it is possible to meet the aforementioned needs and, in particular, to obtain a minimum operating clearance between the shoes and the drum which is kept within design tolerances at low cost and with high reliability.

In particular, by virtue of the provision of a first lever assembly adapted to operate a toothed ring of a strut assembly and a second lever assembly adapted to activate said first lever assembly and hinged to a first shoe and rotationally biased by a second shoe, where a connecting member is provided which connects the second lever assembly to the first lever assembly, where said connecting member allows an idle stroke of the second lever assembly before being able to actuate a rotation of the first lever assembly, where such an idle stroke is recovered when the two shoes have approached the braking surface of the drum with a minimum operating clearance, a parking brake wear recovery device with a low number of components which are easy to make with tight tolerances so as to obtain a high control in the production of devices with a functional clearance as close as possible to the design functional clearance at low cost.

Advantageously, by decreasing the number of components on which the functional clearance dimensioning depends, compared to the prior art, with the same functional clearance dimensioning tolerances, the present invention allows to achieve higher overall tolerances with which the various components are to be made, thus reducing the production costs.

Some advantageous embodiments are the subject of the dependent claims.

FIGURES

Further features and advantages of the automatic adjustment device of the clearance of a drum brake according to the invention will become apparent from the description provided below of preferred embodiments thereof, given by way of non-limiting examples, with reference to the accompanying drawings, in which.

Figure 1:
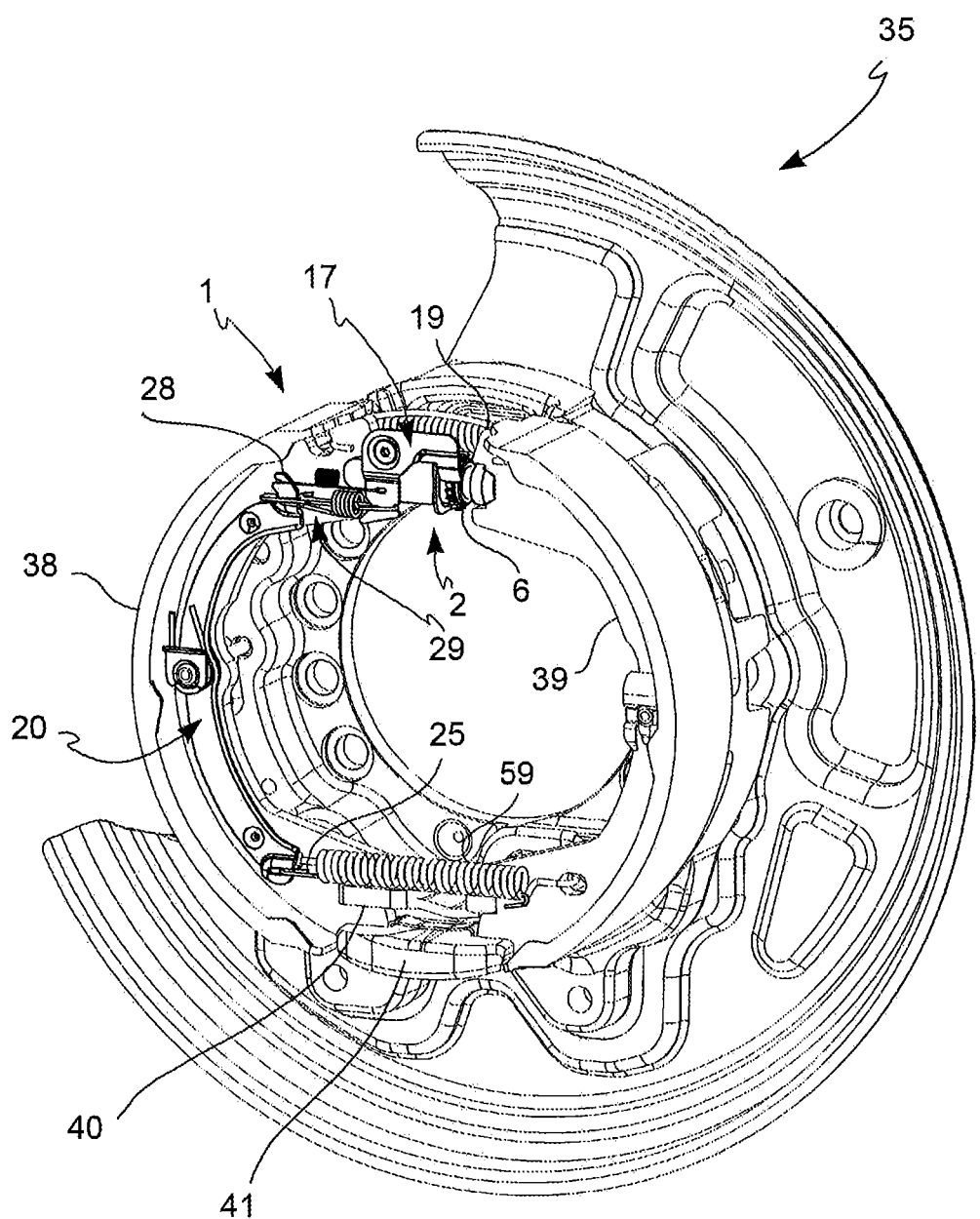
FIG. 1 shows in a partially sectioned axonometric view of a device for automatically adjusting the clearance of a drum brake according to the present invention and a drum brake according to the present invention in which the drum, or the outer part of the bell of a disc brake, has been omitted, to show the internal components of the drum brake.
Figure 2:
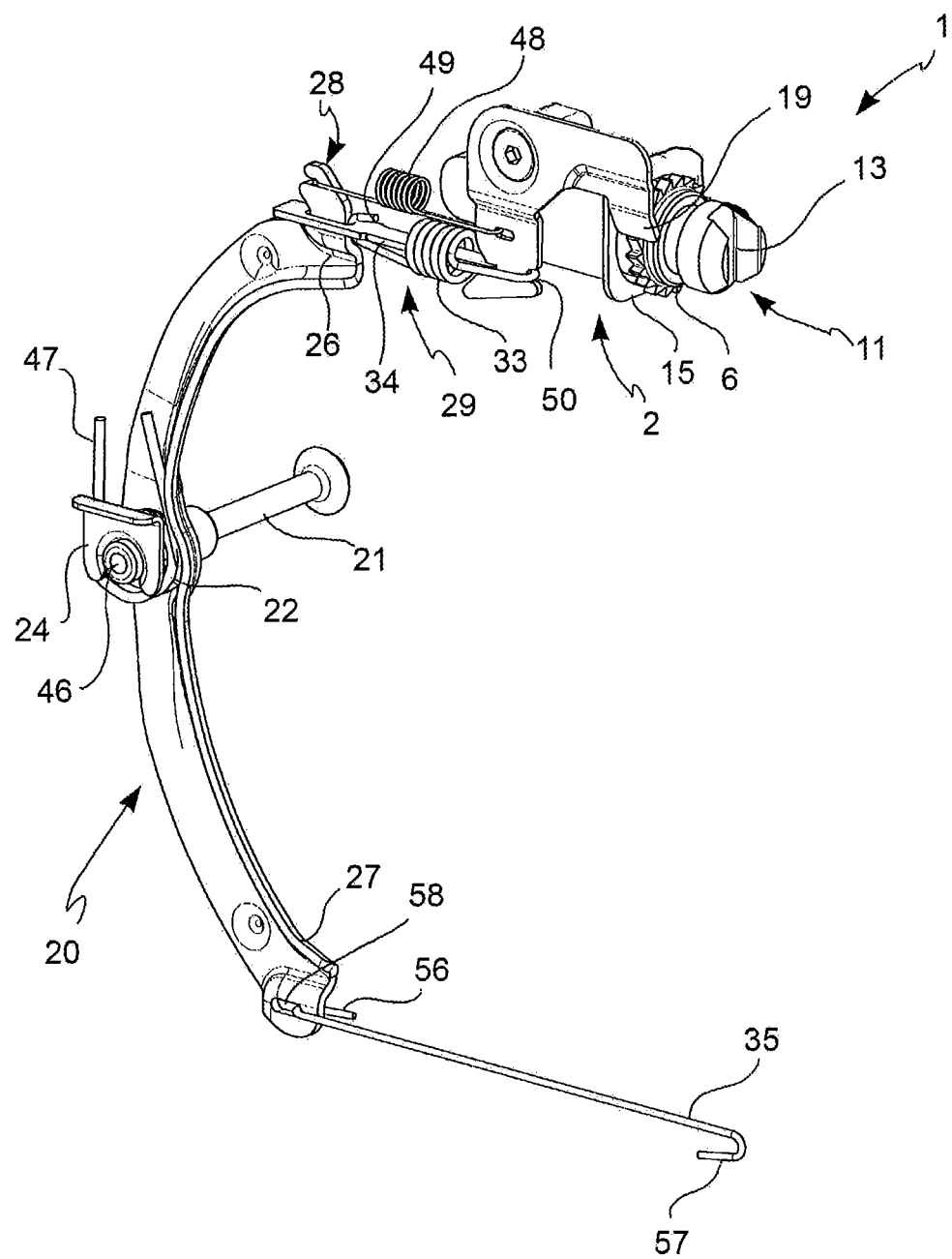
FIG. 2 shows an axonometric view of the automatic clearance adjustment device according to the present invention which comprises an extensible strut assembly, a first lever assembly, and a second lever assembly connected by a connecting member.
Figure 3:
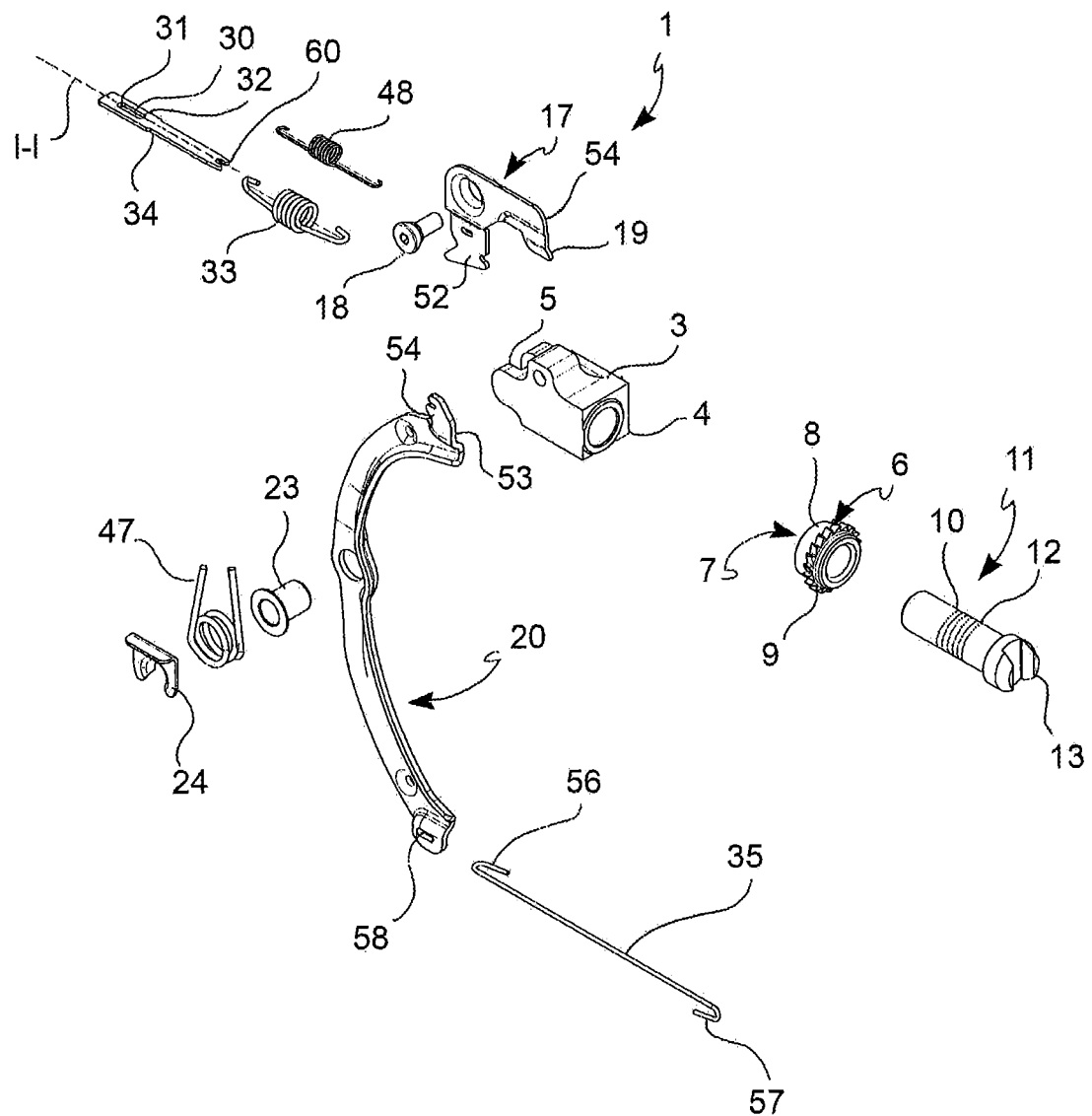
FIG. 3 shows an axonometric view of an exploded view of the device components in FIG. 2.
Figure 4:
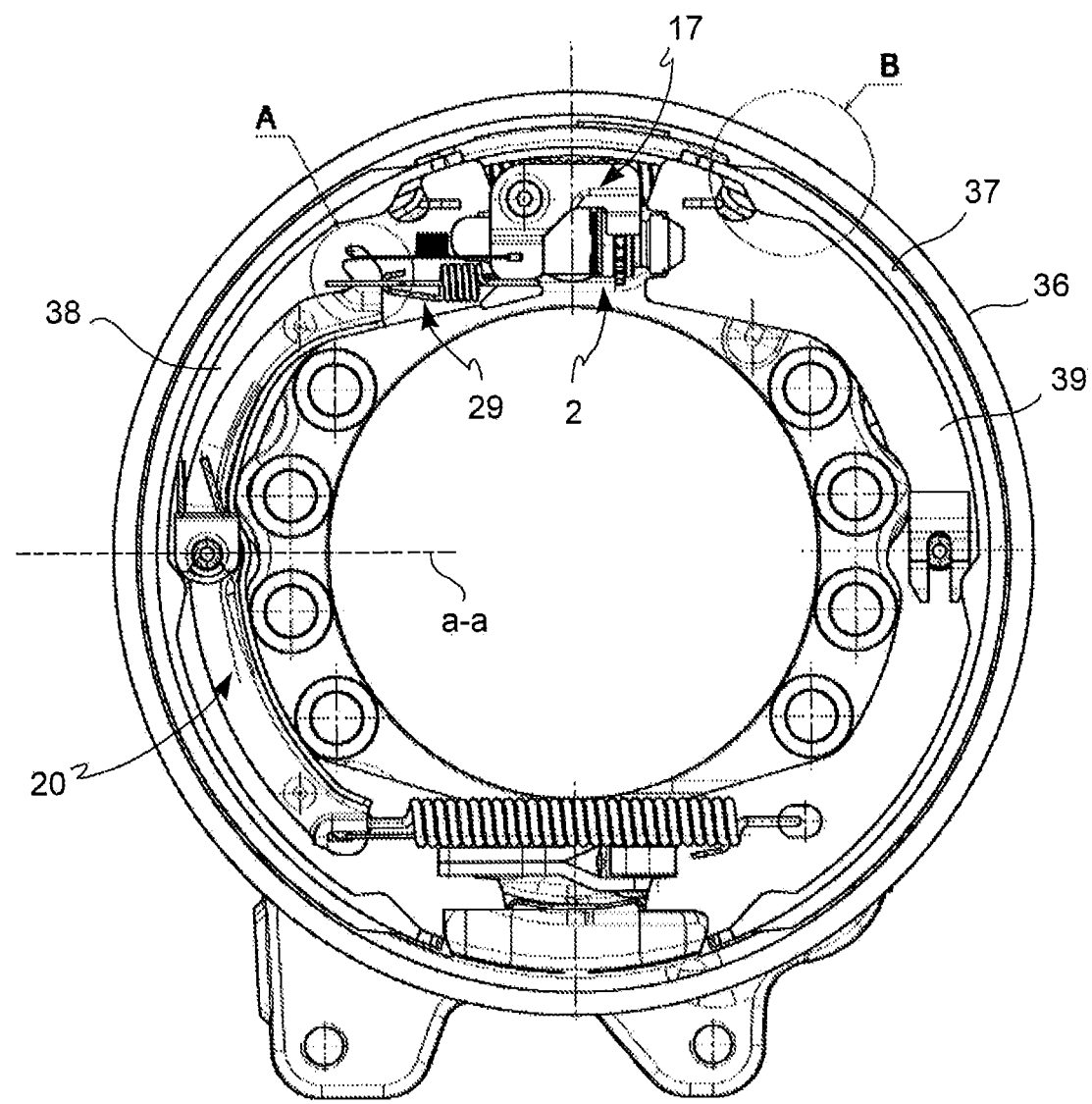
FIG. 4 shows in front view of the device and the drum brake in FIG. 1, in which the shoes of the drum brake are in resting position at a distance from the braking surface of the drum at least equal to the minimum operating clearance and in which the adjusting device is in resting position.
Figure 5:
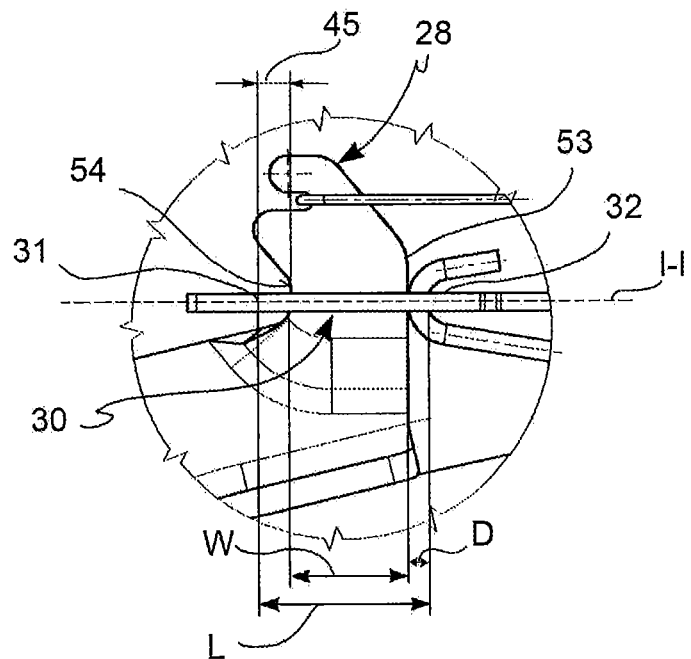
FIG. 5 shows a front view of detail A in FIG. 4 showing the relative position of the second lever assembly and the connecting member.
Figure 6:
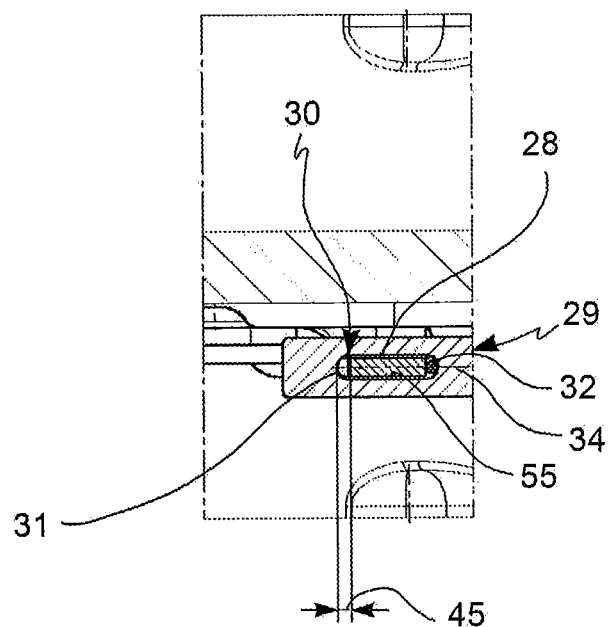
FIG. 6 shows a section view at a plane taken along the longitudinal direction l-l in FIG. 5 in which the functional clearance present between the second lever assembly and the connecting member is shown.
Figure 7:
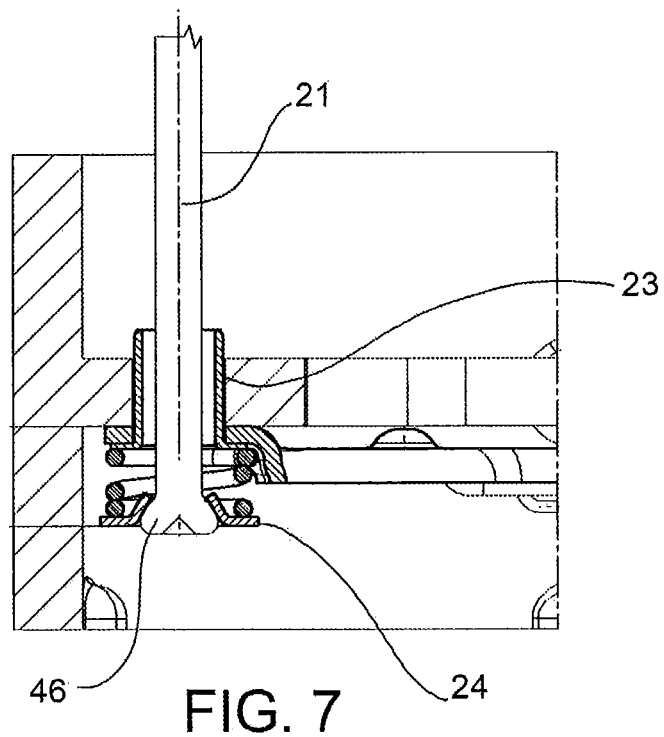
FIG. 7 shows a section view taken along a plane passing along the line a-a in FIG. 4 which is shown in detail a connecting pin of the second lever assembly and a first shoe.
Figure 8:
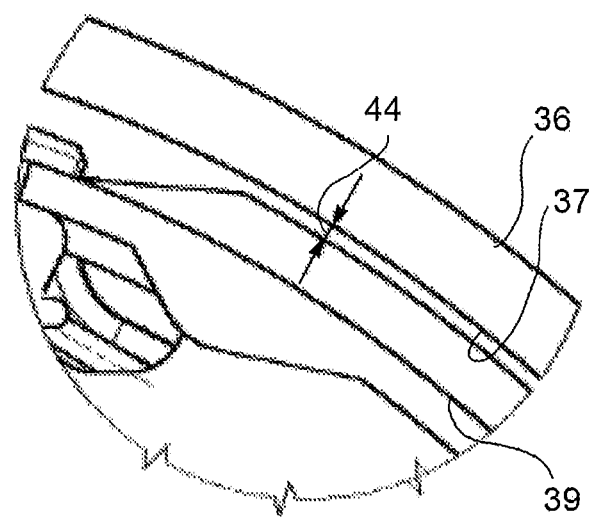
FIG. 8 shows a detail B in FIG. 4 in which the clearance between a shoe and the braking surface of the drum at least equal to the minimum operating clearance is visible.
Figure 9:
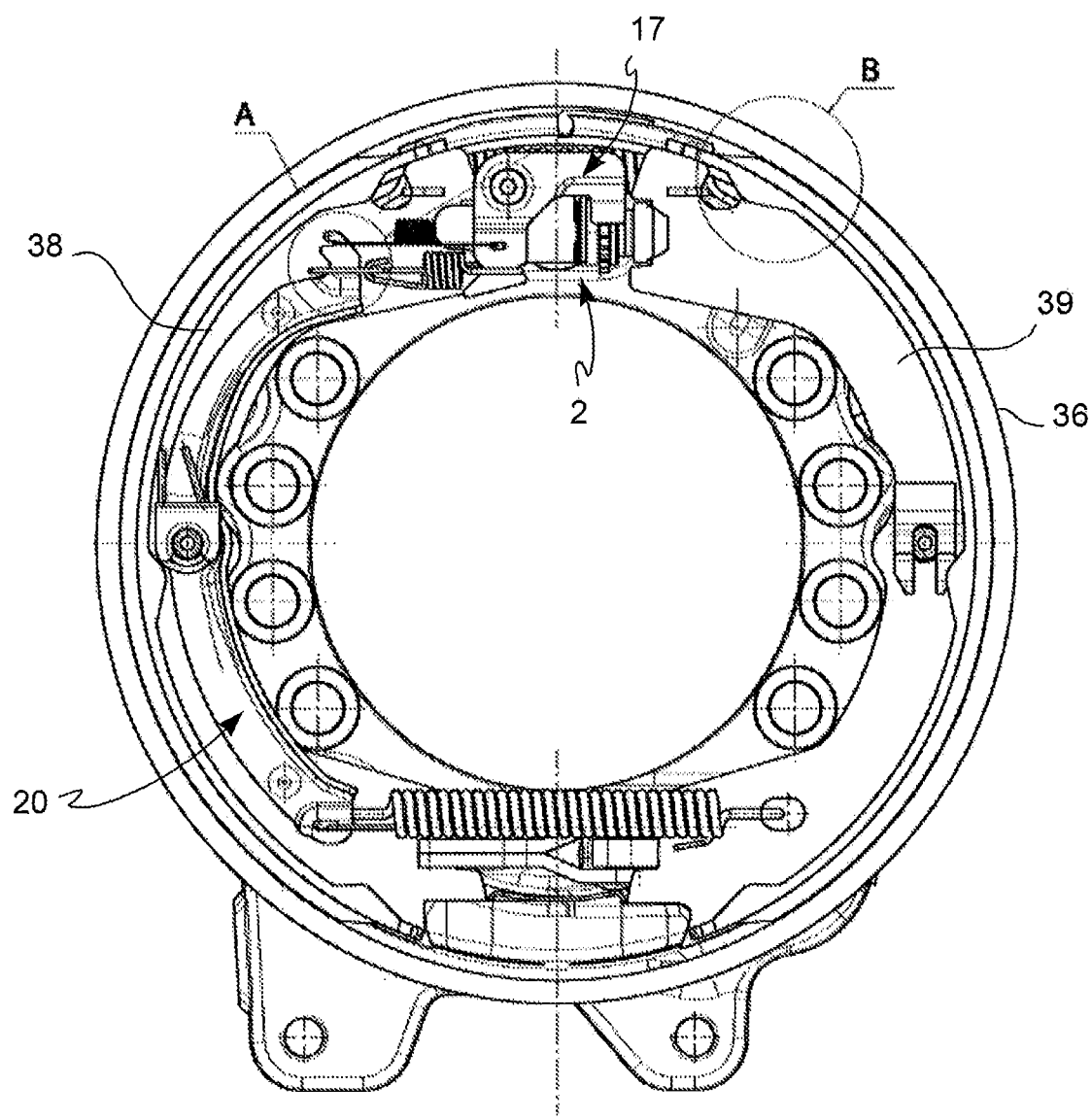
FIG. 9 shows a front view of the device and the drum brake in FIG. 1, in which the shoes are in an approached minimum operating clearance opening position of the braking surface of the drum, and in which the automatic wear adjustment device, biased by the opening of the shoes, is in a functional clearance recovery position.
Figure 10:
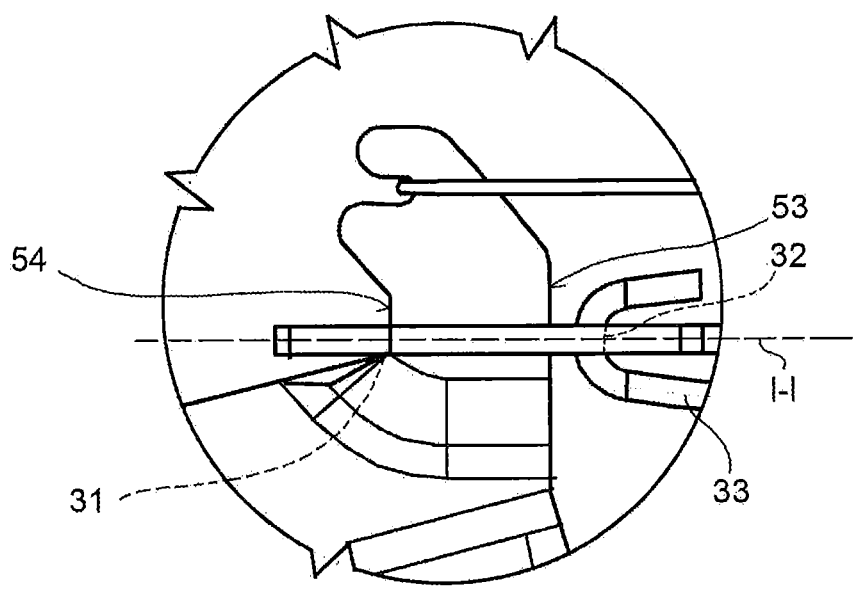
FIG. 10 shows a front view of detail A in FIG. 9 showing the relative position of the second lever assembly and the connecting member.
Figure 11:
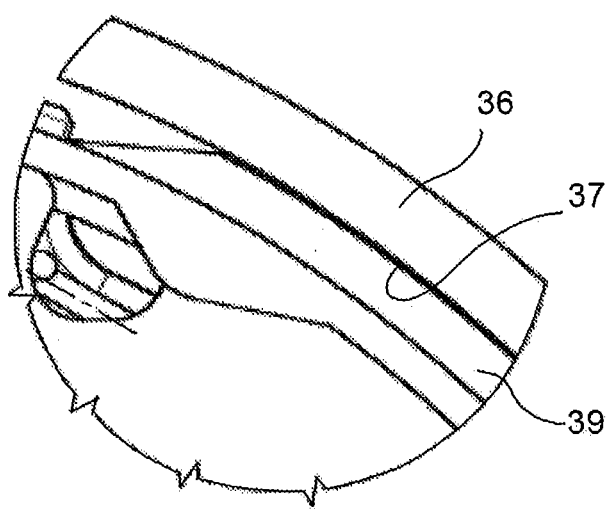
FIG. 11 shows a detail B in FIG. 9 in which the recovery of the minimum operating clearance between shoes and the braking surface of the drum is visible.
Figure 12:
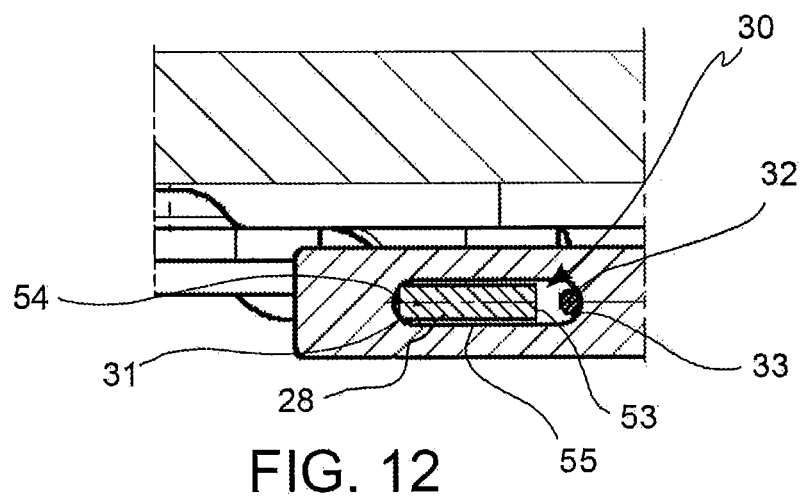
FIG. 12 shows a section view at a plane taken along the line l-l in FIG. 10 in which the functional clearance present between the second lever assembly and the connecting member is shown.
Figure 13:
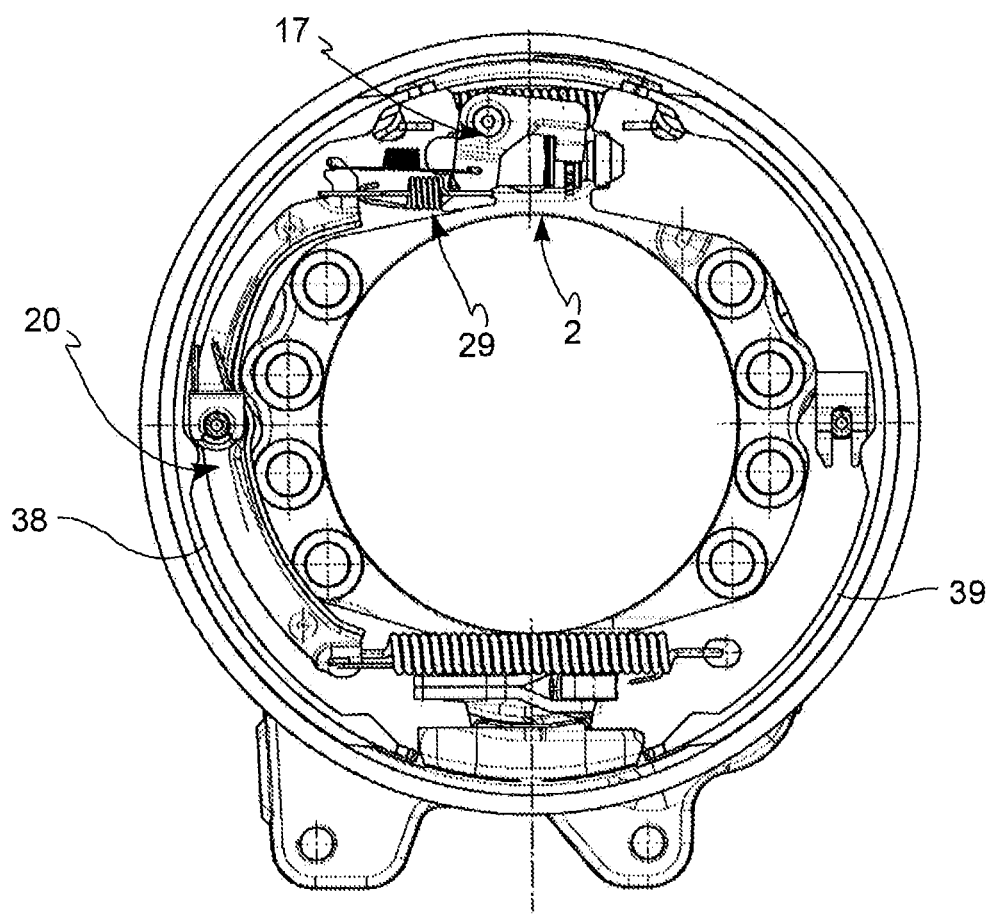
Figure 14:
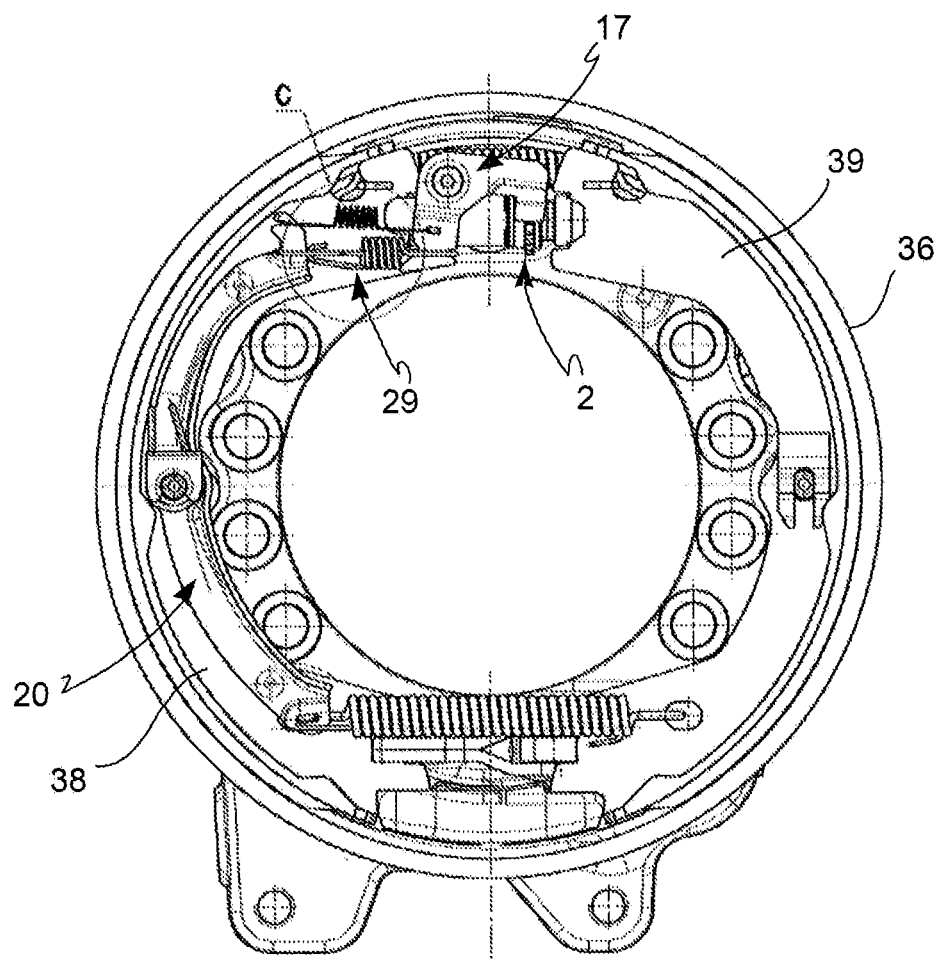
Figure 15:
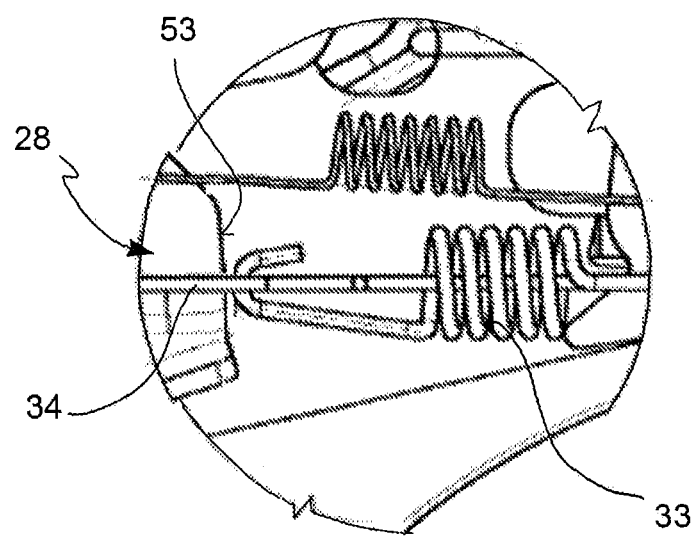
Figure 16:
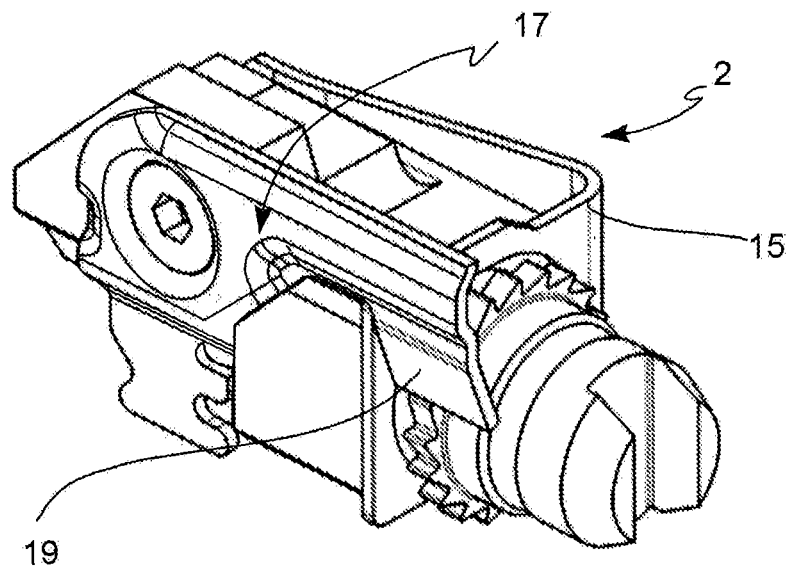
Figure 17:
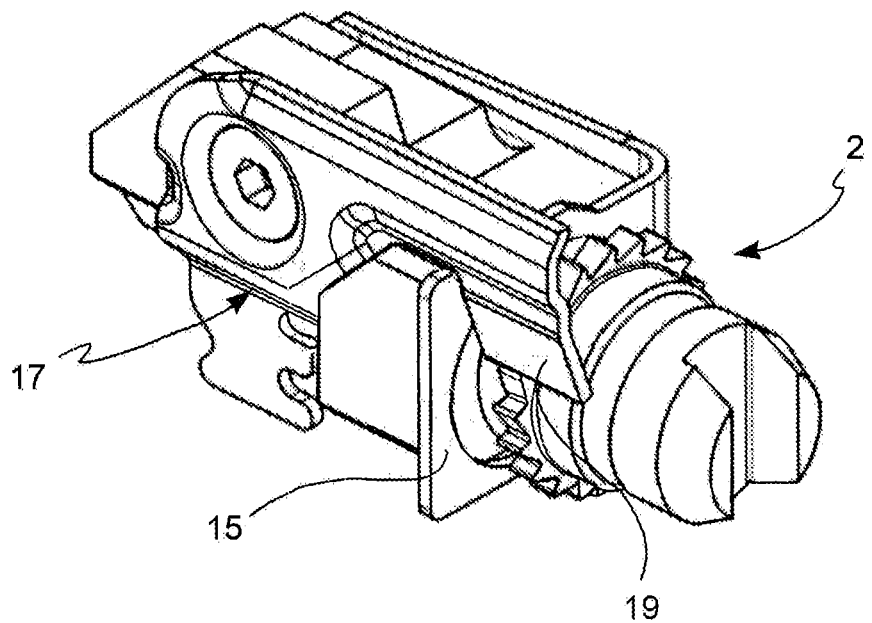
Figure 18:
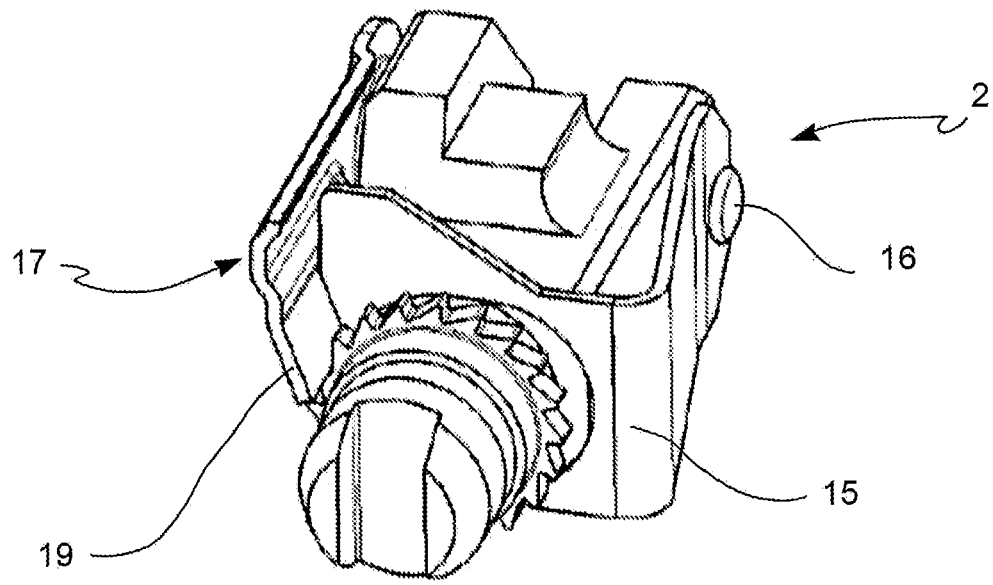
Figure 19:
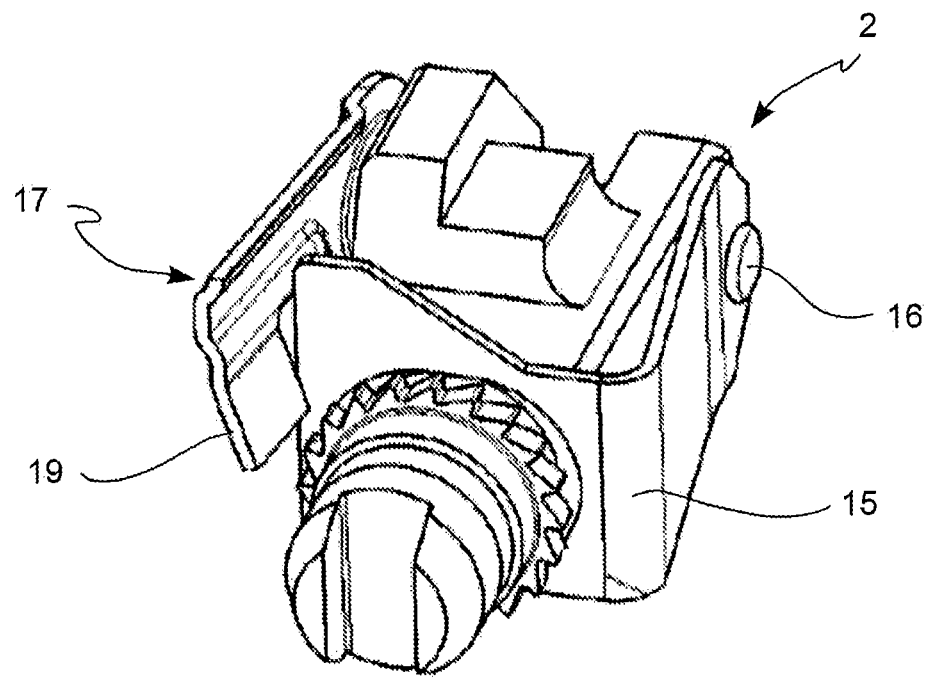

FIG. 13 shows a front view of the device and the drum brake in FIG. 1, in which the shoes are in an open position and approached with respect to the braking surface of the drum by the minimum operating clearance and the clearance due to the wear of the friction material with respect to the braking surface of the drum, and in which the adjusting device is in a wear clearance recovery position in which the first lever assembly is rotated by activating an extension of the extensible strut assembly;

FIG. 14 shows a front view the device and the drum brake in FIG. 1, in which the shoes are in an open position in pressing contact with the braking surface of the drum and in which the adjustment device is in a braking position in which the connection between first lever assembly and second lever assembly is elastically deformed;

FIG. 15 shows a detail C of FIG. 13 in which an elastic element of the connecting member is shown in extension;

FIG. 16 and FIG. 17 show a detail of the device in FIG. 2, in particular a thermal plate according to a first embodiment;

FIG. 18 and FIG. 19 show a detail of the device in FIG. 2, in particular a thermal plate according to a second embodiment.

DESCRIPTION OF SOME PREFERRED EMBODIMENTS

In accordance with a general embodiment, a device for automatically adjusting the clearance of a drum brake is indicated by reference numeral 1.

Said automatic clearance adjustment device 1 comprises an extensible strut assembly 2 with a toothed ring 6.

Said extensible strut assembly 2 is arranged between a first and a second shoe 38, 39, which cooperate with a braking surface 37 of a drum 36.

Said shoes 38, 39 are moved by an actuation device 40 which biases them from a resting position, in which the shoes 38, 39 are away from the braking surface 37 at least by a minimum operating clearance 44, to a braking position, in which the shoes 38, 39 abut against said braking surface 37.

Said strut assembly 2 is subjected to a compression action Fc applied by said shoes 38, 39.

Such a compression action Fc is directly dependent on and contrary to the braking action Ff transmitted to the shoes 38, 39 by the actuating device 40 which, when activated, moves them away from each other recovering the minimum operating clearance until they are pressed against the braking surface of the drum deforming the friction material of the shoes 38, 39 themselves.

Said adjustment device 1 is configured so that a rotation of the toothed ring 6 extends the extensible strut assembly 2 when the braking action Ff and therefore the compression action Fc is below a preset threshold Fs.

Said adjustment device 1 further comprises a first lever assembly 17 associated with said extensible strut assembly 1.

Said first lever assembly 17 has a ratchet mechanism 19 at an end thereof operatively in contact with said toothed ring 6, Said adjustment device 1 comprises a second lever assembly 20 hinged to said first shoe 38 in a rotatable and movable manner, integral with said first shoe 38.

Said second lever assembly 20 comprises a first end 26 of second lever assembly, at which there is a coupling portion 28.

Said coupling portion 28 is rotationally biased by the shoes 38, 39 when said shoes 38, 39 are biased by said actuating device 40.

Said adjustment device 1 comprises a connecting member 29 connected to the first lever assembly 17 and the second lever assembly 20.

In particular, said connecting member 29 comprises a connecting seat 30 adapted to connect the second lever assembly 20. In other words, the second lever assembly 20 is configured to connect the connecting member 29 through said connecting seat 30.

Said coupling portion 28 is coupled to the connecting seat 30 with a predetermined functional clearance 45.

Such a predetermined functional clearance 45 is designed so that when the shoes 38, 39 biased by the actuating device 40 move from the resting position and the minimum operating clearance 44 approaches the braking surface 37, the coupling portion 28 slides into the connecting seat 30 of an idle stroke equal to the functional clearance 45 without transmitting motion to the connecting member 29 and to the first lever assembly 17.

Said second lever assembly 20 is configured to transmit a motion at least to said connecting member 29 only after said coupling portion 28 has traveled said idle stroke equal to said functional clearance 45.

The provision of a connecting member 29 interposed between the first lever assembly 17 and the second lever assembly 20, and mounted with said functional clearance with respect to the second lever assembly 20, allows to easily dimension the functional clearance according to the minimum operating clearance.

According to an embodiment, the connecting seat 30 comprises a first seat end 31 and a second seat end 32 and develops between the first seat end 31 and the second seat end 32.

According to an embodiment, the second seat end 32 is placed in the direction of said first lever assembly 17, while said first seat end 31 is placed in the diametrically opposite direction.

According to an embodiment, said coupling portion 28 comprises a first coupling portion abutment surface 53 and a second coupling portion abutment surface 54 and extends at least between the first abutment surface 53 and the second abutment surface 54.

According to an embodiment, said coupling portion first abutment surface 53 is placed in the direction of said first lever assembly 17, while said coupling portion second abutment surface 54 is placed in the diametrically opposite direction.

According to an embodiment, the coupling portion 28 slides into the connecting seat 30 from a coupling portion first position to a coupling portion second position within said connecting seat 30.

According to an embodiment, in said first coupling portion position, said coupling portion first abutment surface 53 is near the second seat end 32 or abuts with said second seat end 32, and said coupling portion second abutment surface 54 is at a distance equal to the functional clearance 45 with respect to the first seat end 31. Instead, in said coupling portion second position, the coupling portion second abutment surface 54 is in pressing contact with the first seat end 31.

According to an embodiment, the connecting seat 30 has a prevailing development along a longitudinal direction l-l and has a longitudinal seat length L.

According to an embodiment, the coupling portion 28 has at least one development along said longitudinal direction l-l and has a coupling portion width W along the longitudinal direction l-l.

According to an embodiment, the width of the coupling portion W is equal to the distance present between said coupling portion first abutment surface 53 and said coupling portion second abutment surface 54.

According to an embodiment, the functional clearance 45 is the difference between the seat length L and at least the coupling portion width W.

According to an embodiment, the connecting seat 30 is a through seat of the said connecting seat 29.

According to an embodiment, the coupling portion 28 is positioned through the through connecting seat 30.

According to an embodiment, said connecting through seat 30 is a closed-profile through-slot.

According to an embodiment, said closed-profile through-slot has said first seat end 31 and said second seat end 32 as edges substantially perpendicular to said prevailing direction of development l-l, and a connecting seat edge 55 and another diametrically opposite edge as edges along said prevailing direction of development l-l.

According to an embodiment, said connecting seat 30 has an open profile.

According to an embodiment, said open profile is C-shaped and has said first seat end 31 and said second seat end 32 as edges substantially perpendicular to said prevailing direction of development l-l, and a connecting seat edge 55 as edge along said prevailing direction of development l-l.

According to an embodiment, said second lever assembly 20 is hinged on a second lever assembly pin 21.

According to an embodiment, said second lever assembly pin 21 is a pin already present in drum brakes of known type.

According to an embodiment, said second lever assembly pin 21 is integral with said first shoe 38 and comprises a pin head 46.

According to an embodiment, the second lever assembly 20 comprises a bushing 23 positioned in a fulcrum of rotation of the second lever assembly 20 and fitting the second lever assembly pin 21.

According to an embodiment, the bushing 23 is a hinge joint about which the second lever assembly 20 can rotate.

According to an embodiment, the second lever assembly 20 comprises an elastic clamping element 22 interposed between the pin head 46 and an outer surface of the bushing 23.

According to an embodiment, the second lever assembly 20 is held in position on the second lever assembly pin 21 under the bias and contrast of the compression elastic element 22 between a plate 24 locked on the pin head 46 and the bushing 23 acting as hinge joint. In other words, the elastic clamping element 22 is compressed between the bushing 23 and the plate 24 locked on pin head 46 and constrains the second lever assembly 20 to the second lever assembly pin 21.

According to an embodiment, said elastic clamping element 22 is a compression spring.

According to an embodiment, said second lever assembly 20 comprises a second end 27 of second lever assembly.

According to an embodiment, said adjustment device 1 comprises a tie rod 25 connected to said second lever assembly end 27 and said second shoe 39.

According to an embodiment, said tie rod 25 comprises a first tie rod coupling end 56 and a second tie rod coupling end 57.

According to an embodiment, each tie rod coupling end 56, 57 can be hook-shaped.

According to an embodiment, said second end 27 of second lever assembly has a through-slot 58 in which the tie rod coupling end 56 is coupled.

According to an embodiment, the tie rod 25 is connected to the second shoe 39 with said tie rod coupling end 57 coupled to a shoe returning spring 59 connected to the two shoes 38, 39 of the drum brake and configured to keep the shoes 38, 39 integral with the actuating device 40.

According to an embodiment, said shoe returning spring 59 is a traction spring and has a coiled body.

According to an embodiment, said tie rod 25 is shaped so that it is arranged inside said shoe returning spring 59 and that it is coupled with the second tie rod coupling end 57 to an end of the coil-shaped portion of the shoe returning spring 59.

According to an embodiment, said adjustment device 1 comprises a preloaded torsional spring 47 constantly acting on said second lever assembly 20 returning it to a second lever assembly resting position.

According to an embodiment, said torsional spring 47 is configured so as to generate a thrusting action on the coupling portion in the direction of the connecting seat second end 32 and a thrusting action on the other second lever assembly end 27 to keep the tie rod 25 under tension.

According to an embodiment, the preloaded torsional spring 47 keeps the second lever assembly 20 in its resting position when the brake actuating device is not active.

According to an embodiment, the preloaded torsional spring 47 also comprises said elastic clamping element 22.

According to an embodiment, said adjusting device 1 comprises an elastic return element 48 connected to the first lever assembly 17 and the second lever assembly 20 which constantly returns said second lever assembly 20 in the direction of said first lever assembly 17.

According to an embodiment, said elastic return element 48 is configured to keep said second lever element 20 in contact with said first lever assembly 17 through said connecting member 29.

According to an embodiment, the elastic return element 48 is configured to pull said coupling portion 28 in the direction of said second end of connecting seat 32 and to cancel any clearance present between said second coupling portion abutment surface 28, said second end of connecting seat 32 and said second lever assembly 20.

According to an embodiment, the connecting member 29 is configured to allow an integral movement of the first lever assembly 17 and of the second lever assembly 20 when said compression action Fc acting on the extensible strut assembly 2 is below a predetermined threshold Fs.

According to an embodiment, the connecting member 29 is configured to allow a relative movement between the second lever assembly 20 and the first lever assembly 17 when said compression action Fc acting on the extensible strut assembly 2 is higher than said predetermined threshold Fs.

According to an embodiment, if the compression action Fc is such that it blocks and prevents an extension of the extensible strut assembly 2, then the first lever assembly 17 points with the ratchet mechanism 19 to the toothed ring 6, limiting the force which is relieved on the toothed ring 6 as the tensions in play are discharged by an elastic extension of the second lever assembly 20.

According to an embodiment, the connecting member 29 comprises a rigid element 34 and an elastic element 33.

According to an embodiment, said rigid element 34 comprises at least one connecting seat 30.

According to an embodiment, said rigid element 34 comprises a rigid element abutment surface 60 configured to abut against said first lever assembly 17 in contrast and biased by said elastic element 33.

According to an embodiment, said rigid element 34 comprises a U-shaped end portion having said rigid element abutment surface 60.

According to an embodiment, said elastic element 33 is preloaded in extension to a preload value Fp corresponding to said predefined threshold Fs. In other words, when the compression action Fc exceeds the preset threshold Fs then the elastic element 33 can stretch elastically under a bias transferred by the shoe movement to the second lever assembly 20.

According to an embodiment, said elastic clamping element 33 is a traction spring.

According to an embodiment, said rigid element 34 is shaped so as to be positioned inside said elastic element 33 in the form of a traction spring.

According to an embodiment, said elastic element 33 which comprises an elastic element first end 49 and an elastic element second end 50.

According to an embodiment, the elastic element first end 49 is coupled to a second arm 52 of first lever assembly.

According to an embodiment, the elastic element second end 50 is coupled to said rigid element 34.

According to an embodiment, the elastic element second end 50 is at the second end of connecting seat 30 of said rigid element 34.

According to an embodiment, the elastic element second end 50 is made of a metal wire with a diameter D and is attached to the rigid element 34 by passing through the connecting through seat 30.

According to an embodiment, the elastic element second end 50 is positioned between the connecting seat second end 32 and the coupling portion first abutment surface 53.

According to an embodiment, the functional clearance is given by the difference between the connecting seat length L, the coupling portion of width W and the wire diameter of the elastic element D.

According to an embodiment, in said coupling portion first position, said first coupling portion abutment surface 53 is in abutment with said elastic element 33 and said second coupling portion abutment surface 54 is at a distance equal to the functional clearance 45 with respect to the first seat end 31. Instead, in said coupling portion second position, the coupling portion second abutment surface 54 is in pressing contact with the first seat end 31 and the coupling portion first abutment surface 53 is distanced from said elastic element 33.

According to an embodiment, said first lever assembly 17 is hinged to the extensible strut assembly 2 with a first lever assembly pin 18.

According to an embodiment, said first lever assembly 17 comprises a first arm 51 of first lever assembly comprising the ratchet mechanism 19 and a second arm 52 of first lever assembly.

According to an embodiment, said first lever assembly 17 is a first-degree lever.

According to an embodiment, said first arm 51 of first lever assembly and said second arm 52 of first lever assembly are substantially perpendicular to the fulcrum.

According to an embodiment, said first lever assembly pin 18 is a spherical pin.

According to an embodiment, the first arm 51 of first lever assembly and the second arm 52 of first lever assembly are arranged on staggered planes of action. In this manner, a torque is created which tends to take the ratchet mechanism 19 constantly against one of the teeth of the toothed ring 6.

According to an embodiment, in the absence of a braking action Ff, the second lever assembly 20 is kept in its resting position under the bias of the torsional spring 47 and the elastic return element 48, and through the connecting member 29, the second lever assembly 20 transfers a torque to the first lever assembly 17 which keeps the first arm 51 of first lever assembly and the ratchet mechanism 19 in contact with a tooth of the toothed ring 6.

According to an embodiment, said second lever assembly 20 is made in the form of a rocker arm.

According to an embodiment, said extensible strut assembly 2 comprises a thermal plate 15 shaped so as to block the action of said ratchet mechanism 19 following a thermal deformation.

According to an embodiment, said thermal plate 15 is fixed to said extensible strut by means of a fastening element 16, e.g. a nail.

According to an embodiment, said thermal plate 15 is constrained to said extensible strut assembly 2 and is interposed between said toothed ring 6 and said first lever assembly 17.

According to an embodiment, in case of thermal deformation of the thermal plate 15, the first arm 51 of first lever assembly is blocked by the thermal plate 15 against attempted movement.

According to an embodiment, in case of a thermal deformation of the thermal plate 15, the thermal plate 15 pushes the first arm 51 of first lever assembly in a direction such that the ratchet mechanism 19 loses contact with the ring 6.

According to an embodiment, said extensible strut assembly 2 comprises a cylinder body 3 and a piston 11.

According to an embodiment, said cylinder body 3 has a cylinder body tail 5 and a cavity which is closed in the direction of the piston body tail 5 and which has an opening in the opposite direction.

According to an embodiment, said cylinder body 3 has a cylinder body abutment surface 4 around said opening.

According to an embodiment, said piston 11 comprises a piston rod 10 having a piston head 13 of larger diameter than the diameter of piston rod 10 and at least one externally threaded piston rod portion 12.

According to an embodiment, said toothed ring 6 comprises a ring body 8 having a threaded hole screwed to said threaded rod portion 12.

According to an embodiment, the piston 11 is housed with its piston rod 10 in the cylinder body 3, and the toothed ring 6 is interposed between the cylinder body 3 and the piston head 13.

According to an embodiment, said ring 6 comprises a ring abutting surface 7 configured to cooperate, either directly or indirectly, with said cylinder body abutment surface 4.

According to an embodiment, said compression action Fc generated by said shoes 38, 39 on said strut assembly 2 acts on the cylinder body tail 5 and on the piston head 13.

According to an embodiment, said compression action Fc generated by said shoes 38, 39 on said strut assembly 2 acts between said cylinder body abutment surface 4 and said ring abutment surface 7.

According to an embodiment, said ratchet mechanism 19 is a one-way ratchet mechanism which interacts with the toothed ring 6 comprising ring teeth 9 shaped with a slide-shaped tooth side, which allows the ratchet mechanism 19 to climb over the tooth on which the ratchet mechanism 19 acts without rotating the toothed ring 6, and with a coupling tooth side, which allows coupling of the ratchet mechanism 19 and rotation of the toothed ring 6.

The operation of the device will be described below.

Phase K

In the absence of braking action, the device 1 is in the resting position and the shoes 38, 39 are held by the elastic return elements at least at a distance equal to the minimum operating clearance 44 from the braking surface 37 of the drum necessary to ensure free rotation of the drum 36 with respect to the shoes 38, 39.

In the resting position, the second lever assembly 20 or rocker arm has the coupling portion 28 in pressing contact with the first lever assembly 17 by means of the connecting member 29 and the ratchet mechanism of the first lever assembly 17 is in contact with the toothed ring 6.

In more detail, the coupling portion 28 is coupled into the connecting seat 30 of the connecting member 29 and in pressing contact with the first lever assembly 17 on the connecting member 29, which in turn is in contact with the first lever assembly 17. The coupling portion 28 is coupled to the connecting seat 30 with a clearance equal to the functional clearance 45 in the opposite direction to the first lever assembly 17.

In other words, in the resting position, the coupling portion first abutment surface 53 is at the abutment or in pressing contact with the connecting seat second end 32 and the coupling portion second abutment surface 54 is at a distance equal to the functional clearance from the connecting seat first end 31.

Phase X

Following a displacement of the shoes 38, 39, caused by the braking force Fr, which bring the shoes closer to the braking surface 37 of the drum by a distance equal to the minimum operating clearance 44, the second lever assembly 20 pulled by the displacement of the second shoe 39 by the tie rod 25 rotates with respect to the pivot point of the second lever assembly 20 and the first shoe 38.

With the rotation of the second lever assembly 20, the coupling portion 28 slides in the connecting seat 30 by an idle stroke equal to the functional clearance 45 without transmission of motion to the connecting member 29, as well as the first lever assembly 17 which remains with the ratchet mechanism 19 in contact with a tooth of the toothed ring 6, taking the second abutment surface of the coupling portion 54 into contact with the first end of the connecting seat 31.

If the braking force Ff is released from this position, the device 1 returns to the initial resting position described in PHASE K and the shoes 38, 39 return to a distance equal to the minimum operating clearance 44 from the braking surface 37 of the drum returned by the return elastic elements.

Once the functional clearance 45 has been recovered by the idle sliding of the coupling portion 28 in the connecting seat 30 and the approach of the shoes 38, 39 to the braking surface 37 by the minimum operating clearance 44, two conditions may occur:

PHASE Y—Blocking Condition
PHASE Z—Operation in recovery conditions

The following describes PHASE Y—Operation in blocking condition.

The condition is described below in which the distance between the shoes and the drum or the D.I.H. disc bell is equal to the minimum operating clearance 44 and, therefore, there is no wear of the friction material of the shoes and there is no need to operate the extensible strut assembly 2 to approach the shoes 38, 39 permanently closer to the braking surface 37.

The braking action acts on the shoes 38, 39 by pushing them away, which apply a compression action Fc on the extensible strut assembly 2. As long as the shoes 38, 39 are not in contact with the braking surface 37, the shoes 38, 39 move away by compressing the strut assembly 2 with a compression action Fc. When, on the other hand, the shoes 38, 39 come into pressing contact with the braking surface, the compression force Fc acting on the extensible strut assembly 2 increases rapidly due to the interaction between the friction material and the braking surface of the drum. 37

In the absence of wear, following an approach of the shoe 38, 39 to the braking surface 37 by the minimum operating clearance, the second lever assembly 20 rotates and the coupling portion second abutment surface 54 is in pressing contact with the first end of the connecting seat 31. The compression action Fc of the strut is such that it prevents any rotation of the toothed ring 6. Therefore, any rotation of the first lever assembly 17 is blocked. A further distancing of the shoes 38, 39 due to the compression of the friction material, places the second lever assembly 20 in relative rotation with respect to the first lever assembly 17 which remains stationary. The relative rotation of the second lever assembly 20 is obtained by extending the elastic element 33 of the connecting member 29.

When the braking force Ff ceases, the device 1 returns to its initial configuration, by virtue of the bias of the return elements of the second lever assembly 48 and the shoes 59.

Phase Z—Operation in Recovery Conditions

The condition is described in which the distance between the shoe 38, 39 and the drum braking surface 37, i.e. the D.I.H. disc bell, is greater than the minimum operating clearance 44 (advanced wear state).

In this case, the shoes 38, 39 may move further away from PHASE X; therefore, once the shoes 38, 39 have approached the braking surface of drum 37 by the minimum operating clearance 44 causing a rotation of the second lever assembly 20 which puts the coupling portion 28 into pressing contact with the connecting member 29 in the opposite direction to the first lever assembly 17, a further approaching of the shoes 38, 39 to the braking surface of the drum 37 rotates the second lever assembly 20 further and the second lever assembly 20 by moving integrally with the connecting member 29 rotates the first lever assembly 17, the ratchet mechanism 19 of which rotates the strut assembly 2 by extending it and thus moving away the shoes 38, 39 permanently recovering the distance between the shoes 38, 39 and the braking surface of the drum 37 due to friction material wear. The integral movement of the second lever assembly 20 and the first lever assembly 17 is possible as long as the compression force Fc on the extensible strut assembly 2 remains almost constant, i.e. as long as the shoes 38, 39 do not come into pressing contact with the braking surface of the drum 37 and the toothed ring 6 is not blocked, thus blocking any rotation of the first lever assembly 17 and activating the extension of the elastic element 33 as in PHASE Y.

In the step of returning, the device 1 returns to the resting position, and in particular the first lever assembly 17 rotates in the opposite direction and, by virtue of the spherical pivot, the ratchet mechanism 19 slides on the inclined portion of the tooth and goes to the next tooth.

The present invention also relates to a drum brake 50 comprising an adjustment device 1 as described above.

According to an embodiment, the drum brake 50 is of the Drum In Hat type.

The present invention further relates to a method for adjusting the clearance between the shoes 38, 39 of a drum brake 35, comprising the steps of:

providing a device 1 according to any one of the previously described forms;

applying a compression action Fp of less than a predetermined threshold force Fs to the extendable strut assembly 2 by rotating the shoes 38, 39;

rotating the second lever assembly 20 by sliding said coupling portion 28 in the connecting seat 30 with an idle stroke equal to said functional clearance 45 without transmitting motion to said connecting member 29 and to said first lever assembly 17;

alternatively, if the compression action Fp continues remaining below the predetermined threshold force Fs, rotating the second lever assembly 20 thus transmitting a motion integral to the connecting member 29 and to the first lever assembly 17 and engaging the ratchet mechanism 19 in the toothed ring 6 and rotating the ring 6 thus extending extendable strut assembly 2;

or if the compression action Fp exceeds the predetermined threshold force Fs, rotating the second lever assembly 20 without transmission of motion to said first lever assembly 17, thus avoiding to bias said toothed ring 6.

LIST OF REFERENCE SYMBOLS

1 wear clearance adjustment device
2 extendable strut assembly 3 cylinder body
4 cylinder body abutment surface
5 cylinder body tail
6 toothed ring
7 ring abutment surface
8 ring body
9 ring teeth
10 shaft
11 piston
12 externally threaded piston rod
13 piston head
15 thermal plate
16 thermal plate fastening element
17 first lever assembly
18 first lever assembly pin
19 ratchet mechanism
20 second lever assembly
21 second lever assembly pin
22 elastic fastening element of second lever assembly
23 bushing
24 locking plate
25 tie rod
26 first end of second lever assembly
27 second end of second lever assembly
28 coupling portion
29 connecting member
30 connection seat
31 first seat end
32 second seat end
33 elastic element
34 rigid element
35 drum brake
36 drum
37 drum braking surface
38 first shoe
39 second shoe
40 brake actuation device
41 solid block
42 shoe retaining spring
43 shoe returning spring
44 minimum operating clearance
45 functional clearance
46 pin head
47 preloaded torsional spring
48 elastic return element
49 first elastic element end
50 second elastic element end
51 first arm of first lever assembly
52 second arm of first lever assembly
53 first coupling portion abutment surface
54 second coupling portion abutment surface
55 connecting seat edge
56 first tie rod coupling end
57 second tie rod coupling end
58 through-slot
59 shoe returning spring
60 rigid element abutment surface
Ff braking action
Fc compression action
Fs predetermined threshold
Fp preload value
l-l longitudinal direction
L seat length
W coupling portion width
D wire diameter

The invention claimed is:

1. A device for automatically adjusting clearance of a drum brake, comprising
an extendable strut assembly comprising a toothed ring, said extendable strut assembly being arranged between a first shoe and a second shoe that cooperate with a braking surface of a drum, said first and second shoes being moved by an actuating device that biases the first and second shoes from a resting position, in which the first and second shoes are distanced from said braking surface at least by a predetermined minimum operating clearance, to a braking position, in which the first and second shoes abut against said braking surface, wherein said extendable strut assembly is subjected to a compression action applied by said first and second shoes, and wherein rotation of said toothed ring is blocked thereby preventing an extension of said extendable strut assembly when said compression action is higher than a predetermined threshold;
said device further comprising:
a first lever assembly associated with said extendable strut assembly and comprising a ratchet mechanism at an end thereof operatively in contact with said toothed ring,
a second lever assembly hinged to said first shoe and comprising a coupling portion at a second lever assembly first end, wherein said coupling portion is biased in rotation by said first and second shoes when said first and second shoes are biased by said actuating device, and
a connecting member connected to said first lever assembly and comprising a connecting seat configured to connect said second lever assembly,
wherein said coupling portion is coupled to said connecting seat with a predetermined functional clearance so that when said first and second shoes move by action of said actuating device from said resting position approaching said braking surface by said predetermined minimum operating clearance, said coupling portion slides in said connecting seat with an idle stroke equal to said predetermined functional clearance without transmitting motion to said connecting member and to said first lever assembly and wherein said second lever assembly is configured to transmit motion at least to said connecting member after said coupling portion has covered said idle stroke equal to said predetermined functional clearance.

2. The device of claim 1, wherein said connecting seat extends between a first seat end and a second seat end, wherein said coupling portion slides in said connecting seat from a coupling portion first position, in which said coupling portion is either near or in contact with said second seat end to a coupling portion second position, in which said coupling portion is in pressing contact with said first seat end; and wherein said device further comprises at least one of the following features or a combination thereof:
said coupling portion comprises a coupling portion first abutment surface and a coupling portion second abutment surface, said coupling portion first abutment surface facing in direction of said first lever assembly and said coupling portion second abutment surface facing in a diametrically opposite direction, wherein said coupling portion second abutment surface is in pressing contact with said connecting member after said coupling portion has covered said idle stroke equal to said predetermined functional clearance;
said connecting seat has a prevalent development along a longitudinal direction (l-l) and has a longitudinal seat length, and said coupling portion has at least one development along said longitudinal direction (l-l) and has a coupling portion width, wherein said predetermined functional clearance is a difference between said longitudinal seat length and at least said coupling portion width along said longitudinal direction (l-l);

said connecting seat is a through seat of said connecting member and said coupling portion is positioned through said through seat.

3. The device of claim 2, wherein said second lever assembly is hinged onto a second lever assembly pin, said second lever assembly pin being integral with said first shoe and wherein said device further comprises at least one of the following features or a combination thereof:

said second lever assembly comprises a second lever assembly second end and said device further comprises a tie rod connected to said second lever assembly second end and said second shoe;

said device comprises a preloaded torsional spring configured to act constantly on said second lever assembly returning said second lever assembly into a second lever assembly resting position so as to return said coupling portion in direction of said second seat end;

said device comprises a return elastic element connected to said first lever assembly and to said second lever assembly, said return elastic element being configured to return said coupling portion constantly in direction of said second seat end and to cancel any clearance between said coupling portion, said second seat end and said second lever assembly.

4. The device of claim 2, wherein said connecting member is configured to allow an integral movement of said first lever assembly and of said second lever assembly when said compression action on said extendable strut assembly is lower than the predetermined threshold and said connecting member is configured to allow a relative movement between said second lever assembly and said first lever assembly when said compression action on said extendable strut assembly is higher than said predetermined threshold, and/or wherein said connecting member comprises a rigid element and an elastic element, said rigid element comprising said connecting seat, said rigid element being in contact with said first lever assembly in contrast and by action of said elastic element, said elastic element being preloaded in extension to a preload value corresponding to said predetermined threshold, said elastic element comprising an elastic element first end hooked to said first lever assembly and an elastic element second end hooked to said rigid element.

5. The device of claim 4, wherein said first lever assembly comprises a first lever assembly second arm, said elastic element first end being hooked to said first lever assembly second arm; and wherein said device further comprises at least one of the following features or a combination thereof:

said elastic element second end hooked to said rigid element is interposed between said second seat end and said coupling portion first abutment surface and said predetermined functional clearance is given by a distance between said first seat end and said coupling portion second abutment surface when said coupling portion first abutment surface abuts with said elastic element second end;

said elastic element is hooked to said rigid element at the second seat end and is shaped as a traction spring made with a wire having a wire diameter and said predetermined functional clearance is given by a difference between the longitudinal seat length, the coupling portion width and the wire diameter.

6. The device of claim 1, wherein said first lever assembly is hinged to the extendable strut assembly with a first lever assembly pin, said first lever assembly comprises a first lever assembly first arm comprising said ratchet mechanism) and a first lever assembly second arm, wherein said first lever assembly first arm and said first lever assembly second arm are arranged on mutually offset action planes.

7. The device of claim 6, wherein said extendable strut assembly comprises a thermal plate shaped so as to block action of said ratchet mechanism following thermal deformation.

8. The device of claim 7, wherein said thermal plate is constrained to said extendable strut assembly and interposed between said toothed ring and said first lever assembly and in case of thermal deformation of the thermal plate said first lever assembly first arm is blocked by said thermal plate from movement attempt or the thermal plate pushes the first lever assembly first arm in a direction such that the ratchet mechanism loses contact with the toothed ring.

9. A drum brake comprising the device for automatically adjusting clearance of a drum brake of claim 1.

10. A method for adjusting clearance between first and second shoes of a drum brake, the method comprising:

providing a device for automatically adjusting clearance of a drum brake, comprising an extendable strut assembly comprising a toothed ring, said extendable strut assembly being arranged between a first shoe and a second shoe that cooperate with a braking surface of a drum, said first and second shoes being moved by an actuating device that biases the first and second shoes from a resting position, in which the first and second shoes are distanced from said braking surface at least by a predetermined minimum operating clearance, to a braking position, in which the first and second shoes abut against said braking surface, wherein said extendable strut assembly is subjected to a compression action applied by said first and second shoes, and wherein rotation of said toothed ring is blocked thereby preventing an extension of said extendable strut assembly when said compression action is higher than a predetermined threshold;

said device further comprising:

a first lever assembly associated with said extendable strut assembly and comprising a ratchet mechanism at an end thereof operatively in contact with said toothed ring, a second lever assembly hinged to said first shoe and comprising a coupling portion at a second lever assembly first end, wherein said coupling portion is biased in rotation by said first and second shoes when said first and second shoes are biased by said actuating device, and a connecting member connected to said first lever assembly and comprising a connecting seat configured to connect said second lever assembly, wherein said coupling portion is coupled to said connecting seat with a predetermined functional clearance so that when said first and second shoes move by action of said actuating device from said resting position approaching said braking surface by said predetermined minimum operating clearance, said coupling portion slides in said connecting seat with an idle stroke equal to said predetermined functional clearance without transmitting motion to said connecting member and to said first lever assembly and wherein said second lever assembly is configured to transmit motion at least to said connecting member after said coupling portion has covered said idle stroke equal to said predetermined functional clearance;

applying a compression action of less than the predetermined threshold force to the extendable strut assembly by rotating the first and second shoes;

rotating the second lever assembly by sliding said coupling portion in the connecting seat with an idle stroke equal to said predetermined functional clearance without transmitting motion to said connecting member and to said first lever assembly;

alternatively, if the compression action remains below the predetermined threshold force, rotating the second lever assembly thereby transmitting a motion integral to the connecting member and to the first lever assembly and engaging the ratchet mechanism in the toothed ring and rotating the toothed ring thereby extending the extendable strut assembly;

or if the compression action exceeds the predetermined threshold force, turning the second lever assembly without transmission of motion to said first lever assembly, thereby avoiding biasing said toothed ring.

* * * * *